United States Patent [19]
Minbiole et al.

[11] 3,807,489
[45] Apr. 30, 1974

[54] CONDENSATE SENSING SYSTEM

[75] Inventors: Louis J. Minbiole, Detroit; Neville Mapham, Rochester, both of Mich.

[73] Assignee: Oxy Metal Finishing Corporation, Warren, Mich.

[22] Filed: Nov. 10, 1970

[21] Appl. No.: 88,342

[52] U.S. Cl. ........................... 165/1, 62/62, 62/272, 165/39, 317/234 B, 317/100, 174/15 R
[51] Int. Cl. ............................................. H01l 1/12
[58] Field of Search..... 165/32, 39; 317/100, 234 B; 174/15 R; 62/272, 62

[56] References Cited
UNITED STATES PATENTS

| | | | |
|---|---|---|---|
| 2,601,240 | 6/1952 | Blair | 317/234 B X |
| 3,226,941 | 1/1966 | Snelling | 165/105 X |
| 3,656,540 | 4/1972 | Henrici | 165/1 |
| 2,692,961 | 10/1954 | Fondiller | 317/100 |

FOREIGN PATENTS OR APPLICATIONS

| | | | |
|---|---|---|---|
| 1,289,341 | 2/1962 | France | 317/234 B |
| 1,313,314 | 11/1962 | France | 317/234 A |

*Primary Examiner*—Albert W. Davis, Jr.
*Attorney, Agent, or Firm*—Harness, Dickey & Pierce

[57] ABSTRACT

A condensate sensing system which operates by sensing the temperature at which a heat sink is operating, the temperature sensor providing a signal for a control circuit, the control circuit, in turn, regulating the supply of cooling fluid either directly to the heat sink, or to a heat exchanger which supplies cooling fluid to the heat sink.

The control system includes a temperature sensing switch connected in controlling relation with the gate circuit of an alternating current switch in the form of a triac, the triac in turn controlling the energization of a solenoid being supplied electrical energy from an outside source. The solenoid, when energized, may slow or halt the cooling process of the heat sink until such time as the temperature has risen to a preselected level, this level being selected in accordance with the temperature at which condensate forms on the heat sinks.

4 Claims, 2 Drawing Figures

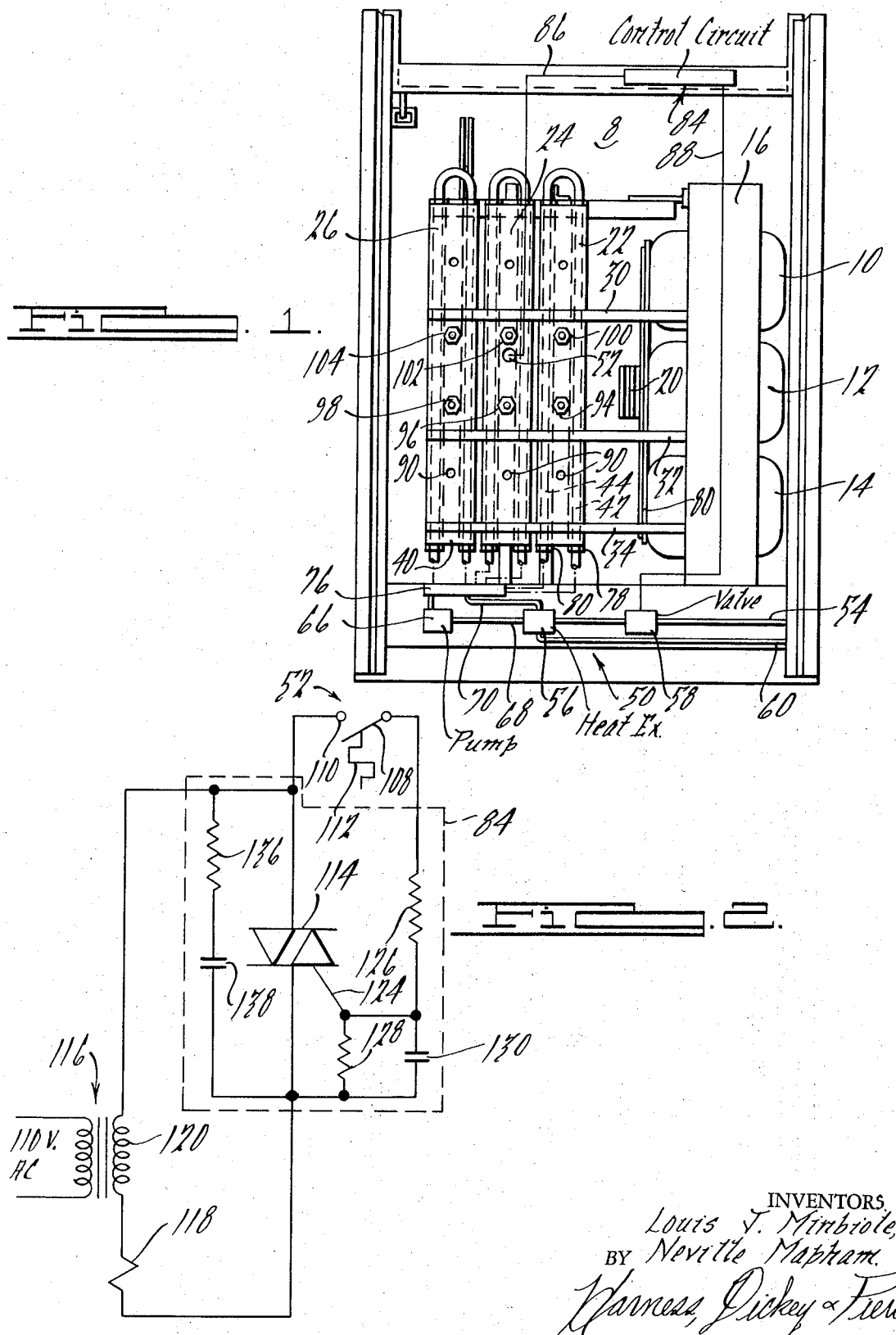

CONDENSATE SENSING SYSTEM

The purpose of the foregoing abstract is to enable the Patent Office and the public generally, and especially the scientists, engineers or practitioners in the art who are not familiar with patent or legal terms or phraseology, to determine quickly from a cursory inspection the nature and essence of the technical disclosure of the application. The abstract is neither intended to define the invention of the application, which is measured by claims, nor is it intended to be limiting as to the scope of the invention in any way.

BACKGROUND AND SUMMARY OF THE DEVELOPMENT

This invention relates generally to a temperature control system and, more specifically, to a temperature control system for controlling the cooling action of an electrical element supporting heat sink to preclude condensate from forming on the heat sink.

It is well known in the electrical arts that liquid cooling of electrical components by means of a metallic heat sink creates problems when the humidity of the environmental air is such to produce condensation of the moisture in the air on the heat sink at certain low temperatures.

While certain systems utilized in the past have provided temperature sensing for controlling the flow of coolent to either a heat exchanger or a heat sink, the common practice was to sense the air temperature. Air temperature sensing provides a false indication of whether condensate is forming on the heat sink itself, in the case of liquid-cooled heat sinks. Obviously, the formation of condensate in a rectifier system creates problems in varying the electrical characteristics of the elements of the rectifier system and also causes failures in the control circuits.

With the system of the present invention, a temperature sensor is mounted directly on a liquid-cooled heat sink, and the actual temperature of the heat sink is sensed. The sensed temperature is utilized to control the energization of a solenoid which in turn controls the flow of cooling fluid to a heat exchanger or to the heat sink proper. This system has been found to eliminate many of the problems attendant with liquid cooling of electrical components.

Accordingly, it is one object of the present invention to provide an improved temperature control system for use in liquid-cooling electrical components.

It is another object of the present invention to provide an improved condensate sensing circuit.

It is still another object of the present invention to provide a system for sensing the temperature of a heat sink and controlling the cooling action of that heat sink in response to the sensed temperature to maintain the temperature above a preselected level and thus avoid condensate forming on the heat sink.

It is still a further object of the present invention to provide an improved solenoid control circuit, the circuit controlling the solenoid in response to a sensed temperature to maintain the temperature above a preselected level and thus avoid condensate in a rectifier system.

It is still another object of the present invention to provide an improved temperature sensing system of the type described which is inexpensive to manufacture and reliable in use.

Further objects, features and advantages of this invention will become apparent from a consideration of the following description, the appended claims and the accompanying drawings in which:

FIG. 1 is an elevation view of a rectifier assembly, with certain cabinet panels removed, and illustrating the general details of a rectifier system and a temperature control system incorporating features of the present invention; and FIG. 2 is a schematic diagram illustrating the electrical circuit which is preferably utilized in connection with controlling the flow of cooling fluid to a heat exchanger.

Referring now to FIG. 1, there is illustrated a typical rectifying system 10 illustrating certain features of the present invention. Specifically, the commercial source of power is connected to a plurality of transformers 10, 12 and 14 which form a three-phase input system for the rectifier. The transformers are supported by means of a support channel assembly 16, the details of which are not critical to the present invention. The secondary windings of the transformers 10, 12 and 14 are center tapped, the center tap being in the form of a common bus bar 18. The common bus bar 18 is connected to an output bus 20 which forms the positive terminal for the load circuit.

The aforementioned interconnections for the transformers 10, 12 and 14 are common in the rectifier art wherein the center taps of the secondary windings of the transformers are all interconnected to form one terminal of the load circuit and the opposite ends of each of the secondary windings are connected to the rectifying elements. Thus, the ends of the secondary windings are interconnected with a plurality of diode mounting heat sink assemblies 22, 24 and 26, the heat sink assemblies illustrated in FIG. 1 also being duplicated on the opposite side and behind the illustrated heat sink assemblies to accommodate diodes for the opposite ends of the secondary windings.

The conductors forming the connections between the correlative ends of all of the transformer secondary windings and the diode heat sink assemblies are formed by means of bus bars 30, 32 and 34, the bus bar 30 being welded to the diode heat sink assembly 22, the bus bar 32 being welded to the diode heat sink assembly 24 and the bus bar 34 being welded to the diode heat sink assembly 26. As is common in the art, the portions of the bus adjacent but not connected to the remaining diode heat sink support assemblies are provided with a sufficient space to avoid corona and short circuiting or are provided with insulating elements interposed therebetween.

The details of the diode cooling assembly are particularly discussed in a copending application of Eugene W. Rabut, Ser. No. 88,341, filed Nov. 10, 1970, for Arrangement for Self-Locking Semiconductor Devices to Heat Sinks and the application of Lynn Zellmer, Ser. No. 88,322, filed Nov. 10, 1970, for Mounting Bracket for Semiconductor Rectifiers to Heat Sinks, the disclosures of which are incorporated herein by reference. The remaining details of the rectifier assembly may be obtained by reference to the copending application of Eugene W. Rabut, U.S. Pat. No. 3,624,488 filed Nov. 10, 1970 for Interphase Transformer Assembly, the disclosure of which is incorporated herein by reference.

As will be seen from a reading of the copending application of Eugene W. Rabut for Arrangement for Self-Locking Semiconductor Devices to Heat Sinks, the heat sinks 22, 24 and 26 are formed from an extruded aluminum channel having a generally flat web section 40 and a pair of fluid-conducting channels 42 and 44 integrally extruded therewith. It is to be understood that the side of the heat sinks 22, 24 and 26 facing the viewer in FIG. 1 is generally flat and the opposite side of the preferred embodiment includes a pair of raised edges to accommodate the hollow passageways therein.

The central portion of the channels 42, 44 are connected to a cooling fluid supply system 50, the cooling fluid supply system being controlled by the temperature sensing element 52 to be described in greater detail hereinafter.

The cooling system includes an input source of cooling liquid, as for example water, which is fed through a conduit 54 to a heat exchanger element 56 through a control valve 58. The return may be provided by an output conduit 60. Thus, as long as the valve 58 is open, cooling fluid will flow from conduit 54 through the heat exchanger 56 and out to the source through the conduit 60.

The heat exchanger also includes an input from a circulating pump 66 which circulates fluid such as propylene glycol through a conduit 68, through the pump 66, a manifold 76 and back to the heat exchanger 56. The output manifold unit 76, in turn, supplies the fluid to, for example, the input side 42 of the diode heat sink assembly 22. Both the input 42 and output 44 conduits of the diode heat assembly 22 are provided with suitable liquid connections 78, 80. The diode heat sink assemblies 24, 26 are also similarly formed. Thus, as long as cooling water is flowing through the heat exchanger unit 56 and is a lesser temperature than the cooling fluid being circulated in the system by the pump 66, the heat exchange will take place and the diode heat sink assemblies 22, 24, and 26 will be further cooled. The pump 66 and heat exchanger 56 may be of any suitable type commercially available.

However, as was stated above, if the cooling continues it is possible to lower the temperature of the diode heat sink assemblies 22, 24 and 26 to a point which is lower than the lowest temperature which condensate will not form. Thus, it is necessary to provide a control circuit for stopping the flow of cooling water in the heat exchanger 56.

To this end, the signal indicative of the sensed temperature at the diode heat sink assembly, for example 24, is provided a control circuit 84 by means of a cable 86. Thus, the control circuit senser is provided a signal which is indicative of the presence of a higher or lower temperature than a preset temperature. If the temperature drops below a preselected level, the control circuit provides an output signal on an output conductor 88 to control a solenoid within the valve 58 and thus close the valve 58 to preclude the flow of cooling fluid to the heat exchanger. Of course, this will stop the exchange of heat within the heat exchanger to permit the diode heat sink assemblies 22, 24 and 26 to again heat up due to the energy being dissipated in the diode elements.

Particularly, the diode elements are mounted in a plurality of apertures 90 formed in all of the heat sink assemblies 22, 24 and 26, the diode heat sink assemblies providing a system for paralleling a number of diodes. For example, two sets of diodes 94, 96, 98 and 100, 102 and 104 are provided, the diodes 94 and 100 being connected In parallel because the diode heat sink 22 is formed from a conductive material. Accordingly, current will flow through the bus 30, through the diode heat sink 22 and then through the stud connections of the actual diodes 94 and 100. Similarly, current flowing in bus 32 will flow through the diode heat sink assembly 24 and then through diodes 96 and 102.

Referring now to FIG. 2, there is illustrated the preferred circuit for controlling the valve 58. Specifically, the temperature setting switch assembly 52 is illustrated as being a normally open switch having an armature 108, the armature 108 preferably being of the bi-metal type. As is common in switches of this type, the switch may be adjusted such that the armature will engage the terminal 110 to close the switch at a preselected temperature. This adjustment feature has been schematically illustrated by the line 112.

The control circuit 84 includes a bidirectional controllable switch 114 in the form of a triac, the triac 114 being connected in series circuit with a source of AC potential at input transformer 116 and the winding 118 of solenoid contained within the valve 58. Thus, energy is impressed on a secondary winding 120 and would flow through the solenoid winding 118 if the switch 114 were provided with a gate signal. The triac 114 includes a gate electrode 124 which is connected to a gating circuit including a pair of resistors 126, 128 and a capacitor 130. The resistor 126 controls the current to the gate to compensate for variation in temperature and gate impedance. The combination of the resistor 128 and capacitor 130 provide a requirement for a minimum threshold signal, the resistor desensitizing the gate and the capacitor suppressing noise.

Thus, when the temperature switch 52 is closed, wherein armature 108 is in contact with terminal 110, a firing signal is provided for the triac device 114 to permit alternating current energy to flow through the solenoid coil 118. The energization of the coil 118 opens the valve assembly 58 to allow cooling water to reach the heat exchanger. The control circuit 84 also includes a resistor 136 and capacitor 138, these two elements being series connected and both elements being connected in shunt across the triac 114 for $dv/dt$ suppression, as is common in the art.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A method of operating a cooling system for a rectifier assembly including a plurality of rectifying elements mounted on a heat sink assembly, the cooling system providing liquid coolant to the heat sink, the method substantially preventing condensate from collecting on the heat-sink including the steps of mounting a temperature sensing means on an exterior surface of said heat-sink on which condensate could form, directly sensing the temperature of the exterior surface, and controlling the operation of the cooling system in response to the sensed temperature of the heat-sink for maintaining the temperature of the heat-sink above the level at which substantial condensate will form.

2. The method of claim 1 wherein said cooling system includes a solenoid valve associated in controlling relation with the flow of input coolant, said controlling step including energizing and de-energizing the solenoid in response to the sensed temperature of the heat-sink.

3. The method of claim 2 wherein said energizing and de-energizing permits cooling fluid to flow when said temperature is above said preselected level and is precluded from flowing when below the said level.

4. The method of claim 3 wherein said cooling system includes a control switch in circuit with said solenoid, said controlling step including controlling the conductive condition of said switch connnected in circuit with the solenoid.

* * * * *